United States Patent
Wada et al.

[11] 3,735,086
[45] May 22, 1973

[54] CIRCUMFERENTIAL ELECTROSLAG WELDING

[75] Inventors: Takeshi Wada; Hisanao Kita; Michio Kitamura, all of Hitachi-shi, Japan

[73] Assignee: Hitachi, Ltd., Tokyo, Japan

[22] Filed: Oct. 19, 1971

[21] Appl. No.: 190,588

[52] U.S. Cl. ................. 219/73, 219/60 A, 219/137
[51] Int. Cl. ............................................ B23k 9/18
[58] Field of Search .................. 219/73, 74, 76, 137, 219/60 A

[56] References Cited
UNITED STATES PATENTS
3,433,926  3/1969  Dick ............................... 219/137
3,211,887  10/1965  Cotterman ...................... 219/126

Primary Examiner—J. V. Truhe
Assistant Examiner—L. A. Schutzman
Attorney—Craig, Antonelli & Hill

[57] ABSTRACT

Circumferential electroslag welding for jointing a pair of cylindrical members in which a water-cooled mold to be removed after the start of welding is placed outside of the annular space formed between the members so that the deposit metal at the start zone is formed outside of the annular space and the tip of a welding wire is steadily guided through a consumable nozzle, the top end of which is electrically connected to the tip of a non-consumable nozzle in the start zone, said top end being partially cut off so that the consumable nozzle can be detached from said wire when said consumable nozzle is consumed to the point of the cut.

3 Claims, 10 Drawing Figures

PATENTED MAY 22 1973
3,735,086
FIG. 1
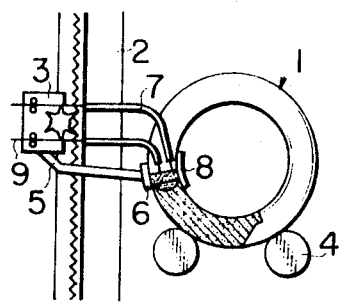
FIG. 2a
PRIOR ART
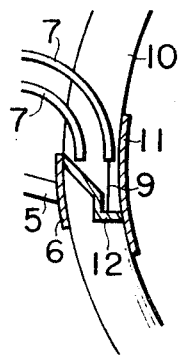
FIG. 2b
PRIOR ART
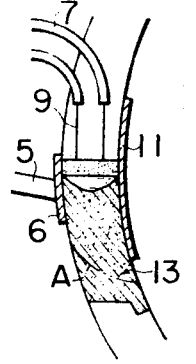
FIG. 3a
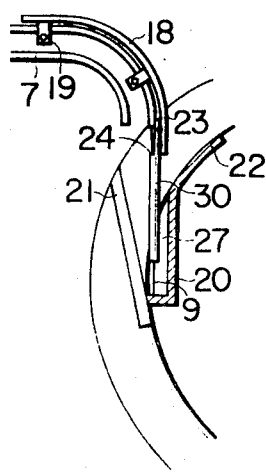
FIG. 3b
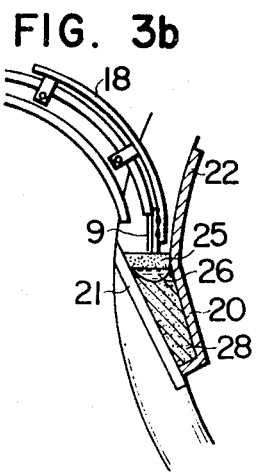
FIG. 3c
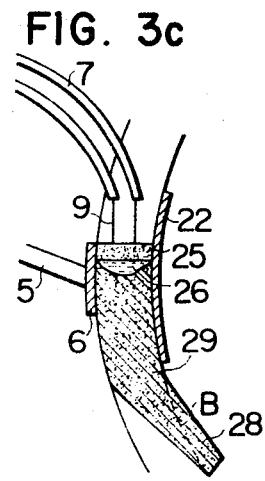
FIG. 4
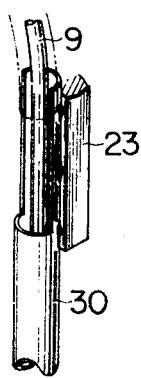
FIG. 5
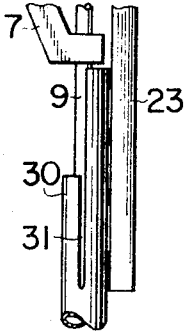
FIG. 7
FIG. 6
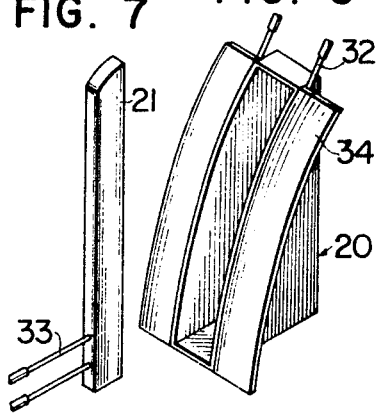
INVENTORS
TAKESHI WADA, HISANAO KITA,
MICHIO KITAMURA
BY Craig, Antonelli & Hill
ATTORNEYS

CIRCUMFERENTIAL ELECTROSLAG WELDING

DESCRIPTION OF THE INVENTION

The present invention relates to improvements in circumferential electroslag welding and, more particularly, to an improvement in the start of welding for circumferential welding of cylindrical members, whereby the start operation can be successfully performed and a change of the start operation to the steady operation can be carried out smoothly.

In the known methods for circumferential electroslag welding, a pair of cylinders to be welded are axially spaced apart by a predetermined distance to form an annular space therebetween. Wire is guided through non-consumable nozzles to a welding zone which is formed by a water-cooled partition shoe inserted in the annular space between the cylinders. The start zone in the conventional methods is located in the annular space and, therefore, since the weld metal of the start zone is unsatisfactory, in order to accomplish a satisfactory meeting of the start and finish zones a chipping operation followed by the step of grinding the chipped surface must be carried out. Since it is very difficult to handle and manipulate tools or devices, such as grinders or chippers, within the narrow annular space, particularly in the case of thick cylinders, these operations necessarily are quite difficult and require a very long period of time.

In the conventional methods, the machining of the start zone cannot be performed until after the welding is stopped. This stopping of welding loses almost all of the advantages of electroslag welding which has been referred to as the most important and productive new method among recent methods of automatic welding. The melting of the start and finish zones is inherent in circumferential electroslag welding and, therefore, it is very important to solve the problems relating to the necessary machining of the start zone in order to improve the productivity of circumferential electroslag welding.

SUMMARY OF THE INVENTION

It is, therefore, an object of the present invention to improve the work efficiency of circumferential electroslag welding.

It is another object of the present invention to improve the start operation of circumferential electroslag welding.

It is still another object of the present invention to provide an improved method of circumferential electroslag welding in which the change from the start operation to the steady operation can be carried out easily and smoothly.

The present invention provides a start operation for circumferential electroslag welding in which a water-cooled start shoe for defining a start zone is placed outside of the annular space formed between a pair of cylindrical members to be welded and a consumable nozzle is electrically connected to a tip portion of a non-consumable nozzle, which can be detached from the non-consumable nozzle when it is desired to interchange the start operation for a steady operation.

Other objects, features and advantages of the present invention will be apparent from the following detailed description when taken in conjunction with the accompanying drawing.

BRIEF DESCRIPTION OF THE DRAWING

FIG. 1 is an end sectional view of a standard circumferential electroslag welding apparatus;

FIGS. 2a and 2b are detail views of conventional circumferential electroslag welding arrangements;

FIG. 3a to 3c are detail views of a circumferential electroslag welding arrangement according to the present invention;

FIGS. 4 and 5 are perspective views of consumable nozzles according to the present invention;

FIG. 6 is a perspective view of a start shoe mounted on the inner circumference of a pair of cylinders; and FIG. 7 is a perspective view of a partition shoe inserted into a groove.

DETAILED DESCRIPTION OF THE INVENTION

As well known, a pair of cylindrical members 1 to be welded by their ends are spaced axially apart by a predetermined distance to form an annular space therebetween. They are mounted on a pair of turning rollers 4 such that they are turned in the welding direction in accordance with the necessary advance of the welding point.

A plurality of non-consumable nozzles 7, whose number is determined in accordance with the thickness of the cylinders or other conditions, are supported by a column 2 which is provided with wire supply means 3. Wire 9 is supplied to each of the non-consumable nozzles and guided to a welding zone which is defined by an inner circumferential shoe 8 and an outer circumferential shoe 6. The shoes are supported by suitable means, such as a supporter 5.

In accordance with a conventional start method, the start zone of the welding is confined by an inner circumferential shoe 11 and a partition shoe 12 inserted into the annular space 10 between the cylinders 1, as shown in FIGS. 2a and 2b. The wire 9 to be used at the start of welding is fed off from a reel and, therefore, the portion of wire projecting from the non-consumable nozzle 7 tends to curl so that it is difficult to steadily guide the tip of wire to the start zone. This is the reason why the length of the projecting portion of wire is limited in the conventional method. Since the start zone, which includes welding defects, is placed inside of the annular space, the weld metal 13 at the start zone must be removed by suitable machining, such as, chipping and grinding, along the line A, prior to joining the start zone and finish zone. Because the annular space 10 is not wide, in general, in view of the work efficiency, the machining is not easy and therefore takes a very long period of time.

In order to solve the above problem, an attempt was made to accomplish a productive machining prior to the meeting of the start zone and finish zone. In accordance with the present invention, the start zone of welding is placed outside of the annular space as will be explained below. In order to perform the above-mentioned process, the present invention also provides new water-cooled shoes as shown in FIGS. 3a to 3c and FIGS. 6 and 7. A water-cooled shoe 20 having a hollow 27 is provided at the inner circumference of the cylinder and a rod-shaped shoe 21, which is water-cooled, is inserted into the annular space to define a start zone with the inner circumferential shoe 20. If a start zone is formed outside the groove, the welding operation can be carried out with high work efficiency since there is no difficult machining to be carried out within the narrow annular space. The weld metal 28 at the start zone can be removed easily without affecting the performance of the welding.

The present inventors, however, discovered that it was substantially impossible to steadily guide the tip of the wire to the start zone, as long as the wire is guided through a non-consumable nozzle 7. The inventors have experienced a number of faults in the start operation. One of the most important causes of fault lies in the fact that the depth or distance between the top of the non-consumable nozzle and the bottom or start zone of the inner circumferential shoe 20 is too large to steadily guide the wire 9 to the start zone.

In order to steadily guide the wire, the present invention proposes that the wire be guided through a consumable nozzle 30 supported on the larger support member 18. In this embodiment, the support member 18 is detachably fixed by fixing members 19 to the non-consumable nozzle 7. To the tip 23 of the support member 18 is fixed, by means of welding, for example, a consumable nozzle 30, the top end of which is partially cut off to form a cut-out portion 24. The consumable nozzle 30 can be removed from the non-consumable nozzle 7 when the consumable nozzle 30 is consumed up to the cut 24, as shown in FIG. 3c. The wire 9 is supplied through the non-consumable nozzle 7 and the consumable nozzle 30 to the start zone.

The tip of wire 9 can be steadily guided through the consumable nozzle 30 to the start zone without any trouble and, therefore, the fault which often occurs during the start can be eliminated.

When the consumable nozzle 30 is consumed up to the cut 24 during the progress of the welding, the top end of the nozzle 30, which is connected to the support member 18, is detached from the non-consumable nozzle 7, whereby the steady welding operation can be smoothly carried out. In FIGS. 3a to 3c, numeral 28 designates weld metal or deposit metal, 26 molten metal and 25 electroconductive flux. After interchange of welding using the consumable nozzle to steady welding using the non-consumable nozzle is finished, and at the same time, the consumable nozzle is detached from the non-consumable nozzle along with the support member. The steady welding is then carried on using an inner circumferential shoe 22 and outer circumferential shoe 6 to deposit the weld metal 29. The weld metal at the start zone 28 can be easily machined and removed along the line B during welding or after finish of circumferential welding. In FIG. 3c the shoes 20 and 21 are removed.

In order to detach the support member 18 and consumable nozzle 30 from the non-consumable nozzle 7, the top end of the nozzle 30 is cut off as shown in FIG. 4. The present inventors have experienced the trouble that wire 9 deflects from the cut 24 formed at the top end of the consumable nozzle 30 when the length of the cut is made sufficiently large to ensure an adequate distance between the surface of molten slag and the tip of the non-consumable nozzle. The consumable nozzle shown in FIG. 5 has an extended slit 31, whereby the deflection or run-out of wire from the consumable nozzle 30 is prevented by the upwardly extended portion. By employing this consumable nozzle, the run-out of wire can be prevented without losing detachability of the consumable nozzle.

The inner shoe 20 used in the start zone has a contour as shown in FIG. 6 in which the water-cooling conduits 32 are fixed to the outer face thereof and plates 34 are in contact with the inner face of cylinders to be welded.

The shoe 21 to be inserted into the annular space to form the start zone with the inner circumferential shoe 20 has a contour as shown in FIG. 7, with which a water-cooling means 33 is provided in connection with an internal conduit in the shoe 21.

What is claimed is:

1. In an apparatus for circumferential electroslag welding of a pair of cylindrical members which are axially spaced apart to form an annular space therebetween, a welding arrangement comprising a water-cooled hollow shoe having the form of a pocket and being mounted on an inner surface of said cylindrical members adjoining said annular space, a water-cooled rod-shaped shoe inserted into said annular space against the bottom of said hollow shoe so that a start zone is formed out of the annular space, a nozzle inserted into said annular space and feeding means for feeding wire through said nozzle into said start zone, said nozzle comprising a first non-consumable portion and a second consumable portion electroconductively and detachably mounted on said non-consumable portion and providing an end through which said wire protrudes into said start zone, said consumable nozzle portion including means having a longitudinal portion thereof removed in such a manner that the consumable nozzle is detached when it has been consumed to the point of the removed longitudinal portion.

2. The combination defined in claim 1 wherein said hollow shoe has an opening which is approximately as wide as said annular space and is disposed in alignment therewith.

3. The combination defined in claim 1 wherein said consumable nozzle has at least one extended slit extending longitudinally from said removed longitudinal portion.

* * * * *